United States Patent [19]

Chown

[11] Patent Number: 4,473,745

[45] Date of Patent: Sep. 25, 1984

[54] OPTICAL RECEIVER WITH SERIES-CONNECTED P-I-N DIODES

[75] Inventor: David P. M. Chown, Harlow, England

[73] Assignee: International Standard Electric Corporation, New York, N.Y.

[21] Appl. No.: 347,136

[22] Filed: Feb. 9, 1982

[30] Foreign Application Priority Data

Apr. 14, 1981 [GB] United Kingdom ................. 8111790

[51] Int. Cl.[3] ............................................ H01J 40/14
[52] U.S. Cl. .................................. 250/214 R; 455/619
[58] Field of Search ............... 250/551, 214 A, 214 R; 330/59, 308; 307/311; 333/28 R; 455/619, 617, 608, 601

[56] References Cited

U.S. PATENT DOCUMENTS

| | | | |
|---|---|---|---|
| 3,995,173 | 11/1976 | Sibley | 250/551 X |
| 4,114,036 | 9/1978 | Tsunekawa et al. | 250/214 R |
| 4,302,774 | 11/1981 | Alm | 333/28 R X |

*Primary Examiner*—David C. Nelms
*Attorney, Agent, or Firm*—John T. O'Halloran; Robert P. Seitter

[57] ABSTRACT

An optical receiver, for responding to optical energy propagating in an optical fibre transmission path (2) is detected by a reverse-biassed p-i-n diode (3) which is connected in series with a forward-biassed p-i-n diode (7). The junction between the two diodes is connected to the input of an amplifier (5), which is part of a two-stage amplifier (5,8), with automatic equalization (9,10,11).

The forward biassed diode, by its characteristics leads to an improved dynamic range for the receiver as compared with conventional optical receivers.

2 Claims, 2 Drawing Figures

OPTICAL RECEIVER WITH SERIES-CONNECTED P-I-N DIODES

FIELD OF THE INVENTION

The present invention relates to an optical receiver, such as used to terminate an optical fibre transmission line.

A known optical communications link is shown in FIG. 1. This consists of an optical transmitter 1, e.g. a light-emitting diode or a laser diode, an optical fibre transmission path 2, and a photo-diode 3, usually a p-i-n diode. This diode, in response to the light reaching it from the pulse 2, generates a photo-current which flows in the load resistor 4. The first stage 5 of a two stage amplifier is connected to the junction of the diode 3 and the resistor 4.

Where an optical receiver has to offer a high sensitivity to optical inputs, i.e. it has to operate with the smallest possible input power so that the maximum loss in the transmission path can be tolerated, the load resistor 4 has to have a high value. This is because as the value of the resistor is increased, the signal voltage generated across it for a given photo-current also increases. At the same time the r.m.s. thermal noise voltage generated by R increase as the square root of the value of the resistor. Thus the ratio of signal to resistor noise is maximized by making the resistor a high value.

Unfortunately making this resistor large reduces the maximum allowable optical input power for satisfactory operation of the receiver, i.e. its dynamic range is reduced. This is because the voltage across the resistor equals the product of the photo-current and the value of that resistor, and as this voltage approaches that of the supply either the photo-diode or the amplifier saturates. Wide dynamic range is particularly important where systems have to operate with a wide range of optical losses, e.g. where line length varies.

SUMMARY OF THE INVENTION

An object of the invention is to provide an optical receiver in which the dynamic range is improved as compared with known systems such as described above.

According to the invention there is provided an optical receiver for receiving optical energy from an optical fibre transmission link, which includes a reverse-biassed p-i-n diode onto which light from the optical fibre link is directed, so that the diode generates a photo-current whose value depends on the magnitude of the incident optical power, a forward-biassed p-i-n diode connected in series with the reverse-biassed diode so that the photo-current flows in the forward-biassed diode, and an amplifier whose input is connected to the junction between the two diodes.

DETAILED DESCRIPTION OF THE INVENTION

Figure 2:
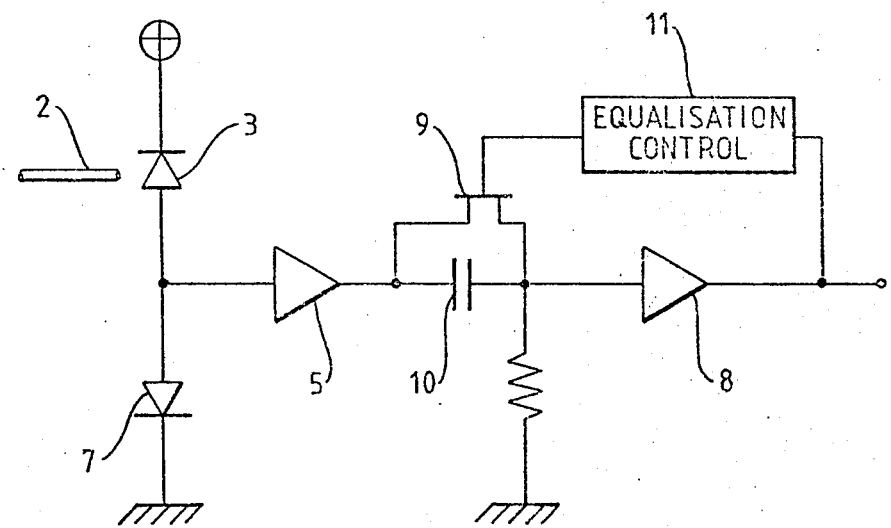
FIG. 2 is a schematic of an optical receiver constructed in allowance with the invention.

An embodiment of the invention will now be described with reference to the accompanying FIG. 2.

Figure 1:
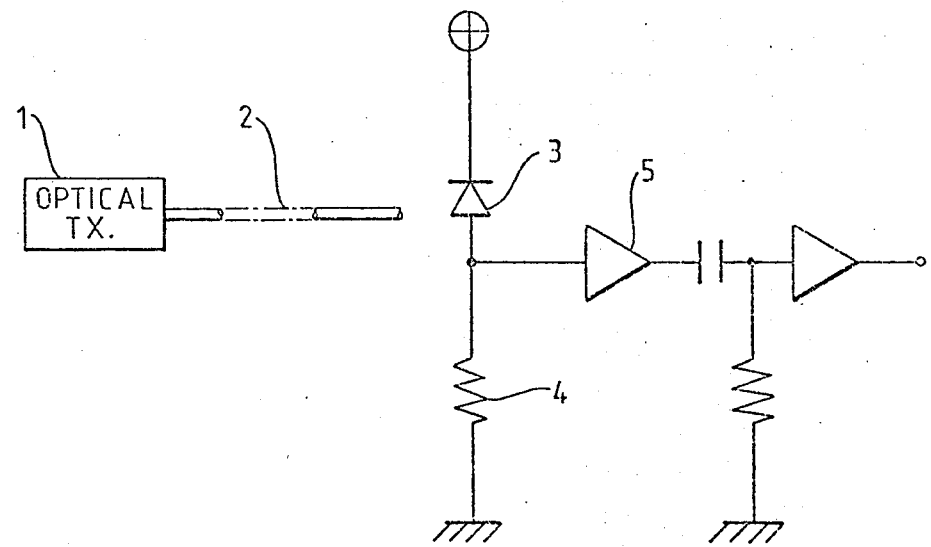
FIG. 1 is a schematic of an optical receiver known in the art.

The main difference between the new arrangement and that of FIG. 1 is that the resistor 4 is replaced by a forward-biassed p-i-n diode 7. This limits the voltage swing at the amplifier input, and it has the merit that at frequencies greater than 1/(minority carrier lifetime) its resistance is essentially linear and is inversely proportional to the average current flowing. Thus the diode 7 behaves at high frequencies, e.g. above 10 Mb/s, like a load resistor whose value automatically falls as the received optical power increases, which prevents saturation at the receiver input, and greatly extends the receiver's dynamic range.

A further merit of the p-i-n diode in this use is due to its very low self-capacitance at zero bias. Another useful part is that it is in some cases possible to use the same diode type for diodes 3 (reverse biassed) and 7 (forward biassed).

The receiver shown uses a variable equalizer between the two stages 5 and 8 of the amplifier, this including a field effect transistor 9 connected across the coupling capacitor 10. This transistor 9 is based controlled via a feedback control circuit connected to the output of the amplifier 8, which further compensates for in line losses.

I claim:

1. An optical receiver for receiving optical energy from an optical fibre transmission link, which includes a reverse-biassed p-i-n diode onto which light from the optical fibre link is directed, so that the diode generates a photo-current whose value depends on the magnitude of the incident optical power, a forward-biassed p-i-n diode connected in series with the reverse-biassed diode so that the photo-current flows in the forward-biassed diode, said forward-biassed diode having a resistance that, at frequencies above 10 Mb/s, falls as the incident optical power increases and an amplifier whose input is connected to the junction between the two diodes.

2. An optical receiver as claimed in claim 1 wherein said amplifier comprises two stages and an equilization control, said equalization control comprising a field effect transistor and a feedback control circuit, said feedback control connected between the output of said amplifier and the gate of said transistor, said transistor having its source and drain connected across a coupling capacitor, said capacitor being connected between said two stages.

* * * * *